(12) United States Patent
Fu et al.

(10) Patent No.: US 7,125,536 B2
(45) Date of Patent: Oct. 24, 2006

(54) NANO-STRUCTURED PARTICLES WITH HIGH THERMAL STABILITY

(75) Inventors: Guoyi Fu, Ellicott City, MD (US); BillieJo Monk, New Providence, PA (US); Corinne Lehaut, Paris (FR)

(73) Assignee: Millennium Inorganic Chemicals, Inc., Houston (*) Notice: Subject to any disclaimer, the term of this patent is extended or adjusted under 35 U.S.C. 154(b) by 329 days.

(21) Appl. No.: 10/773,941

(22) Filed: Feb. 6, 2004

(65) Prior Publication Data

US 2005/0175525 A1 Aug. 11, 2005

(51) Int. Cl.
*B01J 21/00* (2006.01)
*B01J 23/00* (2006.01)
*C01G 1/00* (2006.01)
*C01G 25/00* (2006.01)

(52) U.S. Cl. .............. 423/592.1; 423/593.1; 423/608; 423/610; 423/618; 423/263; 423/594.17; 423/69; 423/89; 423/21.1; 423/62; 423/598; 423/594.12; 423/594.9; 423/594.8; 502/217; 502/353; 502/305; 502/232; 502/355; 502/300; 977/773; 977/775; 977/811

(58) Field of Classification Search ............ 423/608, 423/610, 618, 263, 594.17, 69, 89, 21.1, 423/62, 598, 594.12, 592.1, 593.1, 594.9, 423/594.8; 502/217, 353, 305, 232, 355, 502/300; 977/773, 775, 811
See application file for complete search history.

(56) References Cited

U.S. PATENT DOCUMENTS

| | | | |
|---|---|---|---|
| 5,011,674 A * | 4/1991 | Yoshimoto et al. ......... | 423/610 |
| 5,252,316 A | 10/1993 | Kriechbaum et al. | |
| 5,786,294 A | 7/1998 | Sachtler et al. | |
| 6,030,914 A | 2/2000 | Matsui | |
| 6,511,642 B1 | 1/2003 | Hatanaka et al. | |
| 6,841,143 B1 * | 1/2005 | Inagaki et al. ............ | 423/608 |
| 2001/0036437 A1 | 11/2001 | Gutsch et al. | |
| 2003/0113254 A1 * | 6/2003 | Belov et al. ............ | 423/608 |
| 2003/0125417 A1 | 7/2003 | Vanier et al. | |
| 2004/0007531 A1 * | 1/2004 | Bortun et al. ............ | 210/660 |
| 2004/0067193 A1 * | 4/2004 | Sakatani et al. ........... | 423/608 |
| 2004/0191162 A1 * | 9/2004 | Hai et al. .................. | 423/608 |

(Continued)

FOREIGN PATENT DOCUMENTS

EP 0 517 437 3/1997

(Continued)

OTHER PUBLICATIONS

Yoldas, B., "Zirconium Oxides Formed by Hydrolytic Condensation of Alkoxides and Parameters That Affect Their Morphology," Journal of Materials Science, 21, pp. 1080-1086 (1986).

(Continued)

*Primary Examiner*—Timothy C. Vanoy
(74) *Attorney, Agent, or Firm*—Kalow & Springut LLP; Kevin M. Carroll

(57) ABSTRACT

This invention relates to a composition comprising nano-structured metal oxide particles (particularly, zirconia) and at least one stabilizing agent, a method to produce the composition, and a method to produce the thermally stable nano-structured particles. The method to produce the nano-structured particles comprises first preparing a base solution and a nanoparticle precursor solution, then combining these solutions at a final pH 7 or greater to precipitate a colloidal hydrous oxide. The colloidal hydrous oxide is then treated with at least one silicate, phosphate, or aluminum phosphate stabilizing agent and dried. These nano-structured particle products have high thermal stability and are particularly advantageous in applications as catalysts or catalyst supports that operate at high temperatures.

16 Claims, 6 Drawing Sheets

U.S. PATENT DOCUMENTS

2005/0201917 A1* 9/2005 Chane-Ching .............. 423/263

FOREIGN PATENT DOCUMENTS

| WO | WO 99/59754 | 11/1999 |
| WO | WO 00/24676 | 5/2000 |
| WO | WO 02/12123 | 2/2002 |

OTHER PUBLICATIONS

Caruso, et al., "ZrO2 Phase Structure in Coating Films and Powders Obtained by Sol-Gel Process," Journal of Sol-Gel Science and Technology, 3, pp. 241-247 (1994).

Moon, et al., "Preparation of Monodisperse and Spherical Zirconia Powders by Heating of Alcohol-Aqueous Salt Solutions," J. Am. Ceram. Soc., 78[10], pp. 2690-2694 (1995).

Matsui, et al., "Raman Spectroscopic Studies on the Formation Mechanism of Hydrous-Zirconia Fine Particles," J. Am. Ceram. Soc., 78[1], pp. 146-152 (1995).

Matsui, et al., "Formation Mechanism of Hydrous-Zirconia Particles Produced by Hydrolysis of ZrOCl2 Solutions," J. Am. Ceram. Soc., 80[8], pp. 1949-1956 (1997).

Rivas, et al., "Evolution of the Phase Content of Zirconia Powders Prepared by Sol-Gel Acid Hydrolysis," J. Am. Ceram. Soc., 81[1], pp. 200-204 (1998).

Helble, J., "Combustion Aerosol Synthesis of Nanoscale Ceramic Powders," J. Aerosol Sci., vol. 29, No. 5/6, pp. 721-736 (1998).

Hu et al., "Nanocrystallization and Phase Transformation in Monodispersed Ultrafine Zirconia Particles from Various Homogeneous Precipitation Methods," J. Am. Ceram. Soc., 82[9], pp. 2313-2320 (1999).

"Influence of Some Parameters on the Synthesis of ZrO2 Nanoparticles by Heating of Alcohol-Aqueous Salt Solutions," Journal of Nanoparticle Research, 1:349-352 (1999).

Xia et al, "ZrO2 Nanopowders Prepared by Low-Temperature Vapor-Phase Hydrolysis," J. Am. Ceram. Soc., 83[5], pp. 1077-1080 (2000).

Matsui, et al., "Formation Mechanism of Hydrous-Zirconia Particles Produced by Hydrolysis ZrOCl2 Solutions: II," J. Am. Ceram. Soc., 83[6], pp. 1386-1392 (2000).

Matsui, et al., "Formation Mechanism of Hydrous Zirconia Particles Produced by the Hydrolysis of ZrOCl2, Solutions: III, Kinectics Study for the Nucleation and Crystal-Growth Processes of Primary Particles," J. Am. Ceram. Soc., 84[101], pp. 2303-2312 (2001).

Matsui, et al., "Formation Mechanism of Hydrous of Zirconia Particles Produced by Hydrolysis of ZrOCl2 Solutions:IV, Effects of ZrOCl2 Concerntration and Reaction Temperature," J. Am. Ceram. Soc., 85[3]. pp. 545-553 (2002).

Limaye, et al., "Morphological Control of Zirconia Nanoparticles Through Combustion Aerosol Synthesis," J. Am. Ceram. Soc., 85[7], pp. 1127-1132 (2002).

Deng, et al., "New Hydrolytic Process for Producing Zirconium Dioxide, Tin Dioxide, and Titanium Dioxide Nanoparticles," J. Am. Ceram. Soc., 85[11], pp. 2837-2839 (2002).

Xie, Y., "Preparation of Ultrafine Zirconia Particles," J. Am. Ceram. Soc., 82[3], pp. 768-770 (1999).

Burton, et al., "Optimisation of the Preparation of Ceria/Zirconia Mixed Oxides by Statistical Approach," www.zrchem.com/frames. html, undated, downloaded Dec. 11, 2003.

"General Data Sheets on Zirconium Catalyst Products," www.zrchem.com/catalysisprods.html, undated, downloaded Jan. 5, 2004.

Zhang, Y. et al., "Mesoporous structure and phase transition of nanocrystalline TiO2", *Materials Letters*, vol. 54, (2002), pp. 375-381.

Seo, D-S, et al., "Effect of aging agents on the formation of TiO2 nanocrystalline powder", *Materials Letters*, vol. 51, (2001), pp. 115-119.

Kundakovic, L. J., et al., "Cu- and Ag-modified cerium oxide catalysts for methane oxidation", *Journal of Catalysts*, vol. 179, (1998), pp. 203-221.

"Zirconium Compounds in Cataysts," www.zrchem.com, Nov./Dec. 1992.

"Sulfated Zirconia—A Catoysts Isomerisation Reactions," undated.

* cited by examiner

NANO-STRUCTURED PARTICLES WITH HIGH THERMAL STABILITY

FIELD OF INVENTION

The present invention relates to the field of nano-structured particles.

BACKGROUND OF THE INVENTION

When developing a catalyst, two of the parameters that are most important are the size of the particles that comprise the catalytic material and the thermal stability of those particles. Particle size is important because it relates to surface area, and increasing the surface area can increase efficiency; larger surface areas will provide more places at which the catalytic material may come into contact with substances to be catalyzed. Thermal stability is important, because for many catalytic reactions, a high temperature process is either required or advantageous for better yield, and in order for a catalyst to be effective, the catalyst itself must be stable at those temperatures.

Unfortunately, known technologies for developing particles for use in catalyst applications suffer from being unable to produce particles that have both sufficiently high surface area to mass ratios and sufficiently high thermal stability. For example, porous and mesoporous zirconia products with desirable surface area to mass ratios have been employed in catalysis applications. However, under presently existing technologies, the highly porous structure of those products renders the particles less than optimally efficient during high temperature treatment. According to other known methods, one may produce particles with high thermal stability, but those particles have unacceptable surface area to mass ratios.

Thus, there remains a need to develop compositions comprised of thermally stable nanoparticles that have high surface area to mass ratios. The present invention provides a solution.

SUMMARY OF THE INVENTION

The present invention is directed to nano-structured particulate products that have high specific surface area, which refers to the surface area to mass ratio, as well as high thermal stability. More particularly, the present invention is directed to nano-structured metal-oxide particulate products that have the aforementioned characteristics.

In one embodiment, the present invention provides nano-structured metal-oxide particles that have high thermal stability and high surface area to mass ratios. Preferably these particles have a surface area to mass ratio of 50 $m^2/g$ or greater and are thermally stable at a temperature of at least 600° C. Additionally, preferably the nano-structured metal-oxide particles are comprised of primary particles that are in the size range of 5 nm to 50 nm.

In another embodiment, the present invention provides a composition comprised of nano-structured zirconia particles, wherein said nano-structured zirconia particles have a surface area to mass ratio of greater than or equal to 50 $m^2/g$ and are thermally stable at a temperature of at least 600° C., more preferably, at a temperature of at least 800° C.

In another embodiment, the present invention provides a method of producing a composition comprised of nanoparticles. This method comprises aging nanoparticle precursors in a liquid suspension, preferably in a water suspension at a temperature of greater than or equal to 60° C. at a pH of greater than or equal to pH 7.

In another embodiment, the present invention provides a method of producing a composition comprised of nanoparticles that contain zirconia. This method is comprised of the following steps: (a) combining a zirconium salt solution and a basic solution, wherein said zirconium salt solution comprises a compound selected from the group consisting of zirconium chloride, zirconium oxychloride, zirconium oxynitrate, zirconium sulfate, zirconium oxysulfate and zirconium oxycarbonate; (b) precipitating a colloidal hydrous zirconium oxide precipitate at pH 7 or above; (c) aging said precipitate at a temperature of greater than or equal to 60° C. while maintaining a pH of greater than or equal to pH 7; (d) recovering said precipitate by filtration or centrifugation; (e) drying said precipitate to form dried particles; and (f) calcining said dried particles to form calcined particles.

In another embodiment, the present invention provides a nano-structured metal oxide particle product that comprises: (a) at least one nanometer size primary particle, wherein said at least one nanometer size primary particle is a metal oxide; and (b) a stabilizer, which may also be referred to as a stabilizing agent. Preferably, the stabilizer comprises at least one substance selected from the group consisting of oxoanion species and their corresponding oxides.

The high surface area and high thermal stability of the particulate products of the present invention render the products useful as, for example, catalysts, catalyst supports, adsorbents, and materials for separation membranes. They are particularly useful for applications in which operation at a high temperature is necessary or beneficial. These applications include $DeNO_x$ catalysts, automobile catalysts, and chemical catalysts for high temperature reactions.

For a better understanding of the present invention, together with other and further embodiments, reference is made to the following description taken in conjunction with the examples, the scope of which is set forth in the appended claims.

BRIEF DESCRIPTION OF THE FIGURES

FIG. 3A is a representation of the particles of comparative example 1. FIG. 3B is a representation of the particles of example 3. Both particles were calcined at 800° C. for 6 hours. The figures show differences in particle morphology and structure.

DETAILED DESCRIPTION

Figure 1:
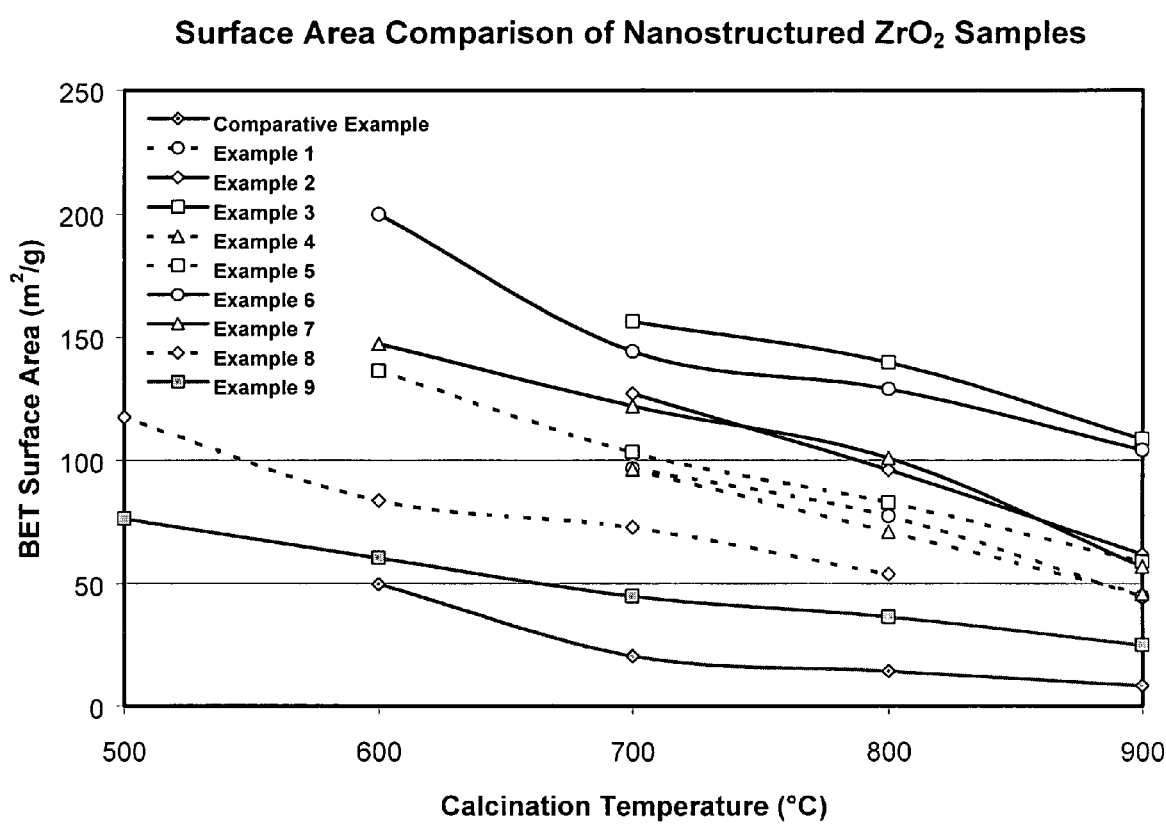
FIG. 1 is a represenation of the thermal stability comparison of nano-structured zirconia particles in which BET surface area values are plotted against calcination temperatures.

The present disclosure is not intended to be a treatise on nanoparticles. Readers are referred to appropriate available texts and other materials in the field for additional background information.

Definitions

As used in this disclosure, certain terms and phrases are, unless otherwise specified, defined as follows:

The phrase "mesopore size range" refers to a size in the range of 2–50 nm as measured by the BET method.

The term "nanoparticles" refers to particles that have an overall size in the nanoscale range of 1–100 nm.

The term "nanoscale" refers to a substance that, in at least one dimension, is in the size range of 1–100 nm.

The phrase "nano-structured particle" refers to a particle that is comprised of one or more subunits (the primary particles or crystallites of the present invention) that has a size of 1–100 nm.

The phrase "primary particle" and the term "crystallite" refer to the smallest discrete particulate units of a substance within a nano-structured particle that bond together through aggregation, surface charge or other inter-particulate forces. For example, "primary particle" and "crystallite" may refer to a molecule or complex of associated elements or molecules such as inorganic metal hydroxides.

Preferred Embodiments

According to the present invention, one is able to produce compositions that contain nano-structured particles that have high specific surface areas and high thermal stability.

According to a first embodiment, the present invention provides a composition comprised of nano-structured metal oxide particles that have a surface area of greater than or equal to 50 $m^2/g$ and are thermally stable at a temperature of at least 600° C. Preferably, the surface area to mass ratio is between 50 $m^2/g$ and 200 $m^2/g$, more preferably between 70 $m^2/g$ and 150 $m^2/g$. The surface area is determined by BET $N_2$ adsorption technology, which is well known to persons of ordinary skill in the art.

The nano-structured particles, whose overall size may be relatively large (up to the micrometer range) and whose shape is largely spherical, consist of nanometer sized primary particles (crystallites) that are chemically and/or physically bound together. The primary particles typically have a size range of 5 to 50 nanometers, and preferably the primary particles are formed so that the pore size distribution is in the range of 2–30 nm. The nano-structured particles formed by the primary particles have unique and characteristic mesoporous structures with high specific surface area and narrow pore size distribution.

The mesoporous structure of the particles is, as noted above, thermally stable at a temperature of at least 600° C., and potentially up to about 1000° C., depending on the nature of the metal oxides involved and whether a stabilizing species, as described below, is used.

The thermal stability of the nano-structured particles of the present invention refers to the robustness of the structure and porosity of the particles toward heat at a given temperature. The stability is measured by the specific surface area values and pore size distribution data that the particles retain after the treatment. For certain metal oxides, a crystalline phase transition occurs in the temperature range of 500° C. to 1000° C. In those cases, high thermal stability of the nano-structured particles may also be quantified by the transition temperature at which the desired crystalline phase (the metastable tetragonal phase in the case of zirconia and the anatase phase in the case of titania) transforms to the less desireable or "higher temperature phase" (the monoclinic phase of zirconia and the rutile phase of titania). Thus, the higher the transition temperature, the higher thermal stability the product has.

Surface area to mass ratio is also an indication of thermal stability. The higher the surface area to mass ratio, the higher thermal stability that the product has when calcined at a desired temperature for a desired peroid of time. As noted above, the surface area of the particles of the present invention refers to the BET specific surface area By way example, according to the first embodiment of the present invention, when a composition is thermally stable at 600° C., the structure of the nano-structured particles will not collapse, and correspondingly the composition's specific surface area will not be significantly reduced after being treated or used at this temperature or any temperature lower than it. Reduction in specific surface area of at least 10% or more would be considered significant. It should be appreciated that the cumulative effect of heat on the particles may cause them to be unstable at a certain temperature only after being held at that temperature for a certain amount of time. As used herein, unless otherwise specified, the thermal stability of the nano-structured particles refers to the stability as measured by being subjected to a particular temperature for at least six hours, e.g., during calcining. Thus, a composition is referred to as thermally stable at that temperature only if it does not breakdown to any appreciable degree, and correspondingly, its specific surface area does not decrease significantly after being exposed to those conditions.

According to a second embodiment, the present invention provides a composition comprised of nano-structured zirconia particles, wherein said nano-structured zirconia particles have a surface area of greater than or equal to about 50 $m^2/g$ and are thermally stable at a temperature of at least 600° C., more preferably at least 800° C. Preferably, the nano-structured zirconia particles have a surface area of greater than or equal to about 70 $m^2/g$.

Within the compositions of this embodiment, the nano-structured zirconia particles are formed by nanometer sized primary particles in such a manner that a large amount of the surfaces of the primary particles are accessible to, for example, substances to be adsorbed, separated, catalyzed, etc. In the mesopore size range, substantially all of the surface measured by BET technology should be accessible.

Additionally, the particle structure is held together strongly and kept largely intact even under high temperature treatment. The primary particles may, for example, be held together primarily by chemical bonds that are formed during thermal treatment and surface charge interaction between the particles. This unique nano-structure thermal stability is a result of the stabilized surfaces of the primary particles that form the nano-structured particles, and may, for example, be obtained by an aging treatment as described below.

Further, preferably the nano-structured zirconia particles are porous agglomerates comprised of nanometer sized primary particles that have interstitial pores (spaces between the primary particles) in the mesopore size range, 5 to 50 nm, preferably with a pore size distribution between 2 and 30 nm, more preferably between 2 and 20 centered at around 10 nanometers.

As described in more detail below, the compositions of the first embodiment or the second embodiment may further comprise a stabilizer or stabilizing agent, which can be used to increase thermal stability further.

According to a third embodiment, the present invention provides a method of producing a composition comprised of nanoparticles. This method comprises aging nanoparticle precursors in a liquid suspension at a temperature of greater than or equal to 60° C. while maintaining a pH of greater than or equal to pH 7. A "nanoparticle precursor" is a substance that may be processed to form a nanoparticle. Thus, it is a substance that may be transformed into a metal oxide or already is a metal oxide that may be processed to form a composition of the present invention.

The precursors are aged for a time that enables the formation of the thermally stable product with the desired surface area. The duration of this "extended period" of time for aging is in part dependent upon the temperature at which the aging takes place. For example, at higher temperatures, a shorter "extended period" is needed. Further, longer aging may be desirable if a higher thermal stability is desired and/or particles with larger surface area to mass ratios are desired. In some embodiments, the method is carried out for a period of between 10 hours and 100 hours. In certain preferred embodiments, at least one and more preferably all of the following conditions exist: the aging is conducted at a temperature of at least 80° C; the aging is conducted for at least 24 hours; and the pH is greater than or equal to pH 9.

By aging the particles at the appropriate temperature, for the appropriate time and under the appropriate conditions, one is able to form compositions with high thermal stability that retain high specific surface areas even after high temperature treatments. It is postulated that aging makes the particles' surfaces more inert toward thermal treatment, and the aggressive growth of the particles during thermal treatment may thereby be prevented or reduced. This allows for higher surface area to mass ratios. The surface inertness also reduces the chance of pore elimination during thermal treatment even at very high temperatures.

During aging, typically the pH of the slurry decreases due either to continuation of the hydrolysis reaction, which consumes hydroxide groups, or the evaporation of the base molecules such $NH_3$, or both. Extra base may be added as necessary to maintain the pH in the desired range.

The method of this embodiment may be used to produce high surface area products of metal oxides, mixed metal oxides and composite metal oxides. These products may, for example, contain at least one metal oxide selected from the group consisting of zirconia, titania, hafnia, tin oxide, ceria, niobium oxide and tantalum oxide.

When the product comprises zirconia, preferably, the nanoparticle precursors form a colloidal hydrous zirconium oxide precipitate. Further, preferably the colloidal hydrous zirconium oxide precipitate is formed by combining a zirconium salt solution and a base solution at a pH of 7 or above. The zirconium salt solution may, for example, comprise at least one substance selected from the group consisting of zirconium chloride, zirconium oxychloride, zirconium oxynitrate, zirconium sulfate, zirconium oxysulfate and zirconium oxycarbonate.

Hydrolyzable organic zirconium compounds such as zirconium alkoxides may also be used as precursor materials. Similar salt products and alkoxides may be used as precursor materials for other metal oxides including but not limited to titania or ceria oxides. Examples of precursor materials for titania and ceria include but are not limited to titanium oxychloride, titanium oxysulfate, titanium isopropoxide, cerium (III) nitrate, cerium (IV) ammonium nitrate and cerium (IV) ammonium sulfate.

Ammonia and any organic bases soluable in water with pKa at about 9 or higher may be used for the production of the precipitate. The organic bases include, but are not limited to, methylamine (pKa=10.657), ethylamine (pKa=10.807), diethylamine (pKa=10.489), ethylenediamine (pKa1=10.712), n-butylamine (pKa=10.77), piperidine (pKa=11.123), n-hexylamine (pKa=10.56) and cyclohexylamine (pKa=10.66). Urea, although not a strong organic base itself, may also be used, because, upon heating, urea molecules decompose, generating ammonia. Ammonia and organic bases are prefered to inorganic bases such as sodium hydroxide, potassium hydroxide, etc. Ammonia and organic bases can be easily removed during a calcination step while, when using inorganic metal hydroxides, if enough residue is left after washing as would be the case with the inorganic bases such as sodium hydroxide and potassium hydroxide, there would be promotion of sintering of the particles. As a result, with the inorganic bases such as sodium hydroxide and potassium hydroxide, the stability of the nanostructure would be reduced and the surface area values would be lowered.

Although not wishing to be bound by any one theory, it is postulated that the aforementioned useful bases function not only as Bronsted bases, providing $OH^-$ groups to precipitate the salt as a hydroxide or hydrous oxide, (for example, they may provide the $OH^-$ groups when precipitating the zirconium salt as zirconium hydroxide or hydrous zirconium oxide,) but also as Lewis bases that may replace water or hydroxyl groups on the precipitated particle surfaces. The latter function is believed to be the driving force that makes ammonia and organic bases effective at increasing the thermal stability of the particles of the present invention, as compared to inorganic alkaline metal hydroxides.

The precipitation may be done by any method that is now known or that comes to be known, and that from reading this disclosure, one skilled in the art would conclude that it would be advantageous to use in connection with the present invention. For example, one may accomplish precipitation by the "double-jet" method, which refers to the simultaneous addition of a salt solution, e.g., a zirconium salt solution, and the base solution to a reactor under constant agitation with controllable inflow rate of the base solution so that a constant pH (typically pH equal to or greater than 9) may be maintained throughout the precipitation. It may also be carried out by the single jet process, which involves adding a salt solution to a suitable amount of the base solution or adding a base solution to a suitable amount of salt solution in the reactor under constant agitation. The precipitation may be stopped once the desired pH is reached or more base may be added if necessary to maintain the precipitate at the desired level before the precipitation is complete. The desired pH may be referred to as the "ending pH."

Additionally, the method may further comprise: (a) recovering the precipitate; (b) drying the precipitate to form dried particles; and (c) calcining the dried particles to form calcined particles.

The recovering step may, for example, be accomplished by filtering, decanting or centrifugation. Typically, following recovery, the precipitate will be washed with a solvent suitable for removing undesirable moieties. For example, water may be used as a solvent.

The drying step may, for example, be performed by placing the precipitate in an oven. Preferably, this occurs after a washing step. Alternatively, the washed precipitate may be re-slurried to a desired concentration and spray-dried.

The calcining step may be carried out at a desired temperature. The nano-structured zirconia particles of the present invention have preferably been calcined at a temperature of at least 600° C., more preferably at least 700° C., and most preferably at least 800° C. in order to further process and to measure the thermal stability of the particles. Additionally, preferably the calcination step is performed for at least six hours. The calcined particles may either be the desired nano-structured particles themselves or further processed to form nanoparticles with desired attributes. The further processing after calcination may, for example, comprise milling the calcined particles. Milling is a technique that is well known to persons skilled in the art, and may be used to obtain particles of a desired size.

Prior to aging, the precipitates are amorphous. However, after aging especially for aging times of 24 hours or longer, the material acquires certain crystallinity. High resolution TEM (transmission electron microscopy) imaging reveals that after aging when the nanoparticles are zirconia based, sufficiently aged material may contains approximately 2–5 nanometer-sized crystallites. The lattice fringes of individual crystallites corresponding to certain crystallographic d-spaces are clearly observable. Due to the very small size, powder XRD (X-ray diffraction) patterns show only very broad lines.

After calcination, the material transforms into highly crystalline porous aggregates of nano-structured particles that have a crystallite size of about 5–50 nm. Additionally, the pore size distributions are preferably centered at about 2–30 nm.

According to a particularly preferred embodiment, the present invention provides a method of producing a composition comprised of nanoparticles, wherein said method is comprised of: (a) combining a zirconium salt solution and a base solution, wherein said zirconium salt solution comprises a compound selected from the group consisting of zirconium chloride, zirconium oxychloride, zirconium oxynitrate, zirconium sulfate, zirconium oxysulfate and zirconium oxycarbonate; (b) precipitating a colloidal hydrous zirconium oxide precipitate; (c) aging said precipitate at a temperature of greater than or equal to 60° C. while maintaining a pH of greater than or equal to pH 7; (d) recovering said precipitate by filtration or centrifugation; (e) drying said precipitate to form dried particles; and (f) calcining said dried particles to form calcined particles. These calcined particles may either be nanoparticles that are used in desired applications or further processed to form nanoparticles with any desired attributes. The further processing may, for example, comprise milling the calcined particles.

As with the previous embodiment, according to this embodiment, preferably the method is carried out under at least one and preferably under all of the following conditions: the aging is conducted at a temperature of at least 80° C.; the aging is conducted for at least 24 hours; and the pH is greater than or equal to pH 9.

Figure 2:
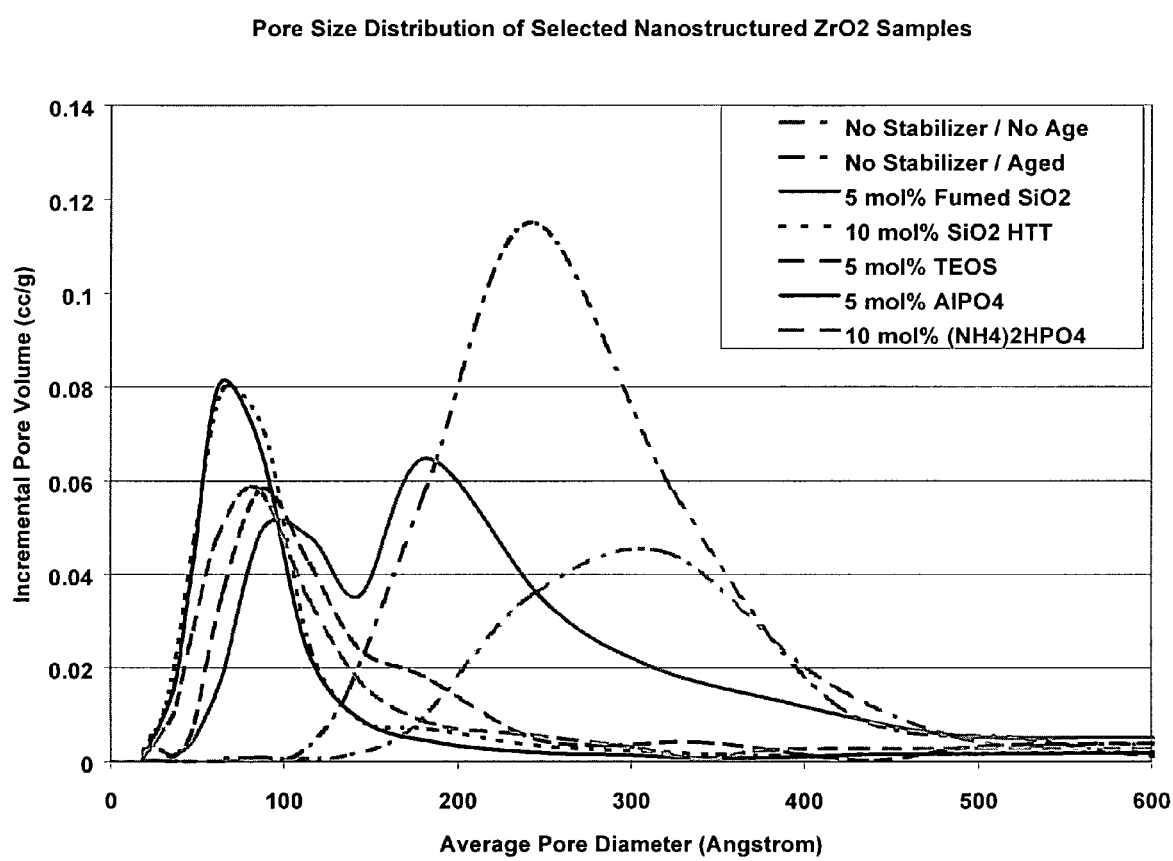
FIG. 2 is a representation of pore size distribution curves of nano-structured zirconia particles. All samples were calcined under the same conditions, 800° C. for 6 hours.
Figures 3A, 3B:
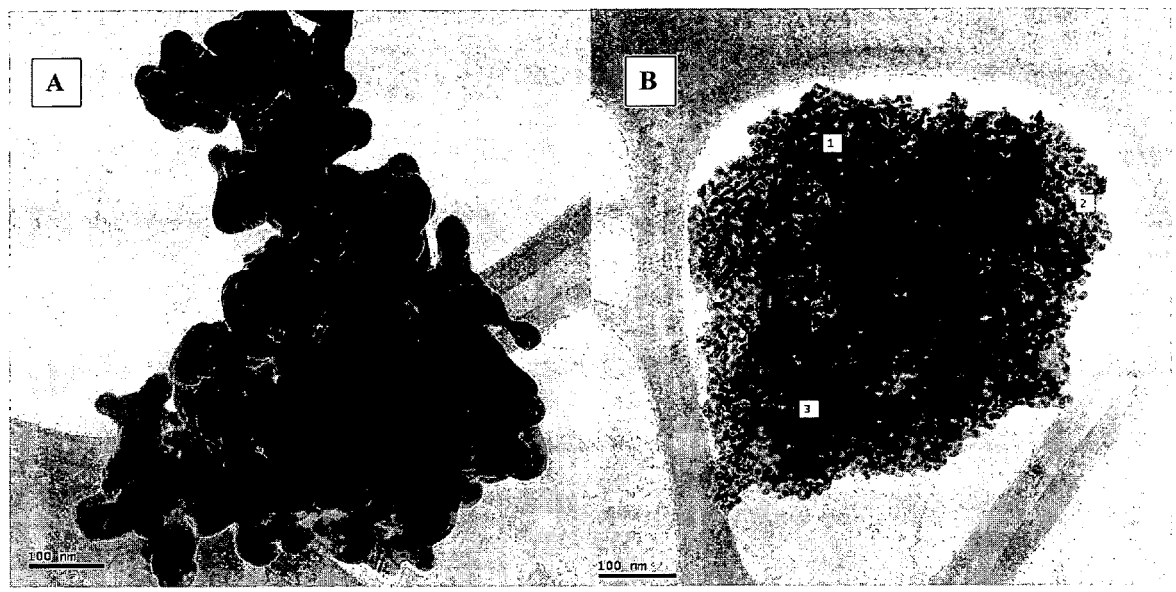
FIGS. 3A and 3B are representations of TEM (transmision electron microscopy) images of nano-structured zirconia particles.
Figures 3C, 3D:
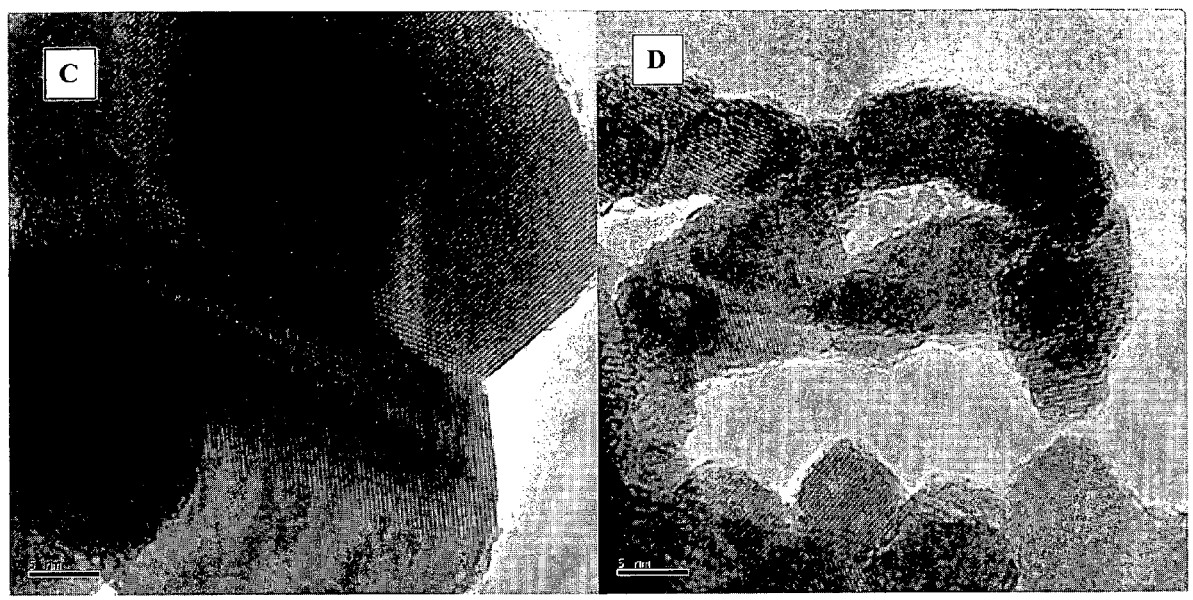
FIG. 3C is also a representation of the particles of comparative example 1 and is at a higher magnification than FIG. 3A.
FIG. 3D is a representation of the particles of example 6. Both particles were calcined at 800° C. for 6 hours and show differences in individual crytallites.
Figure 4:
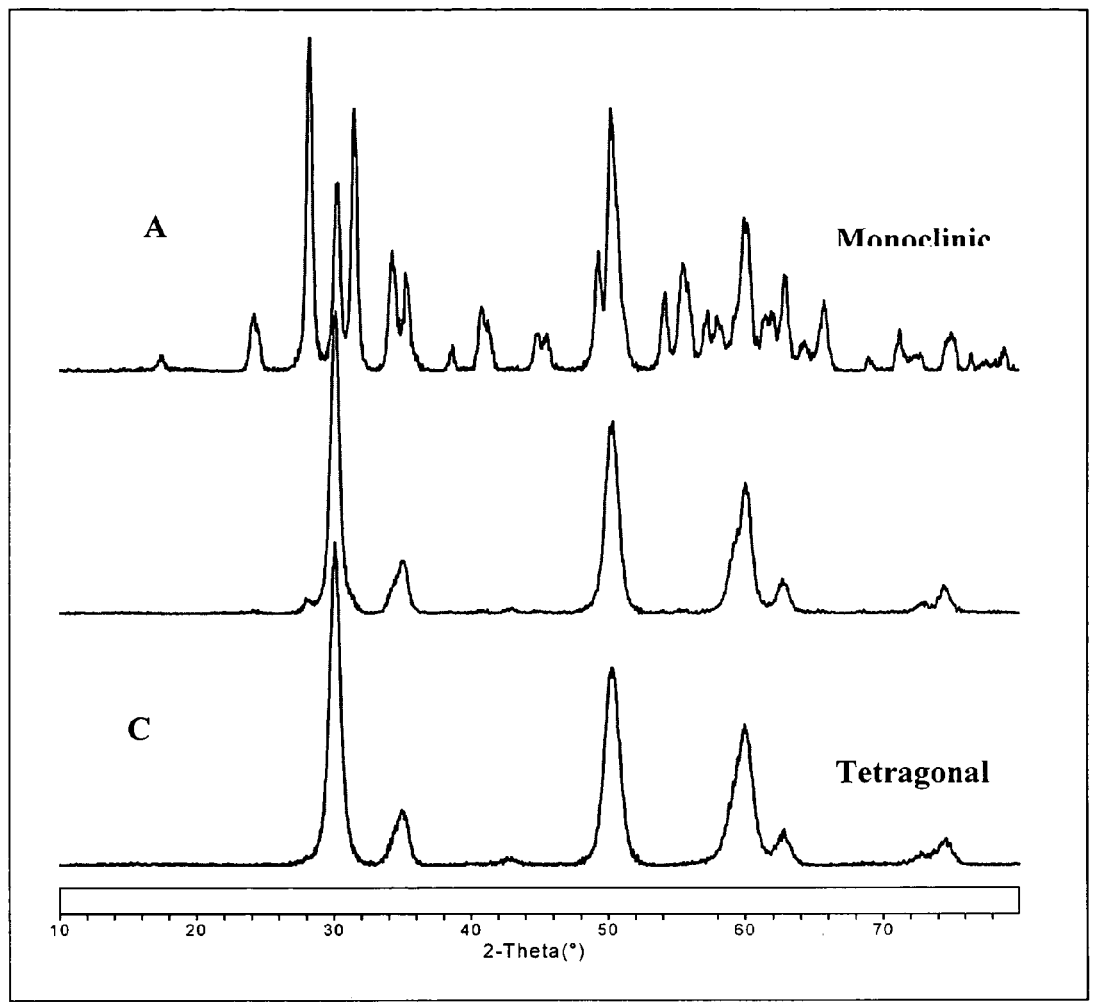
FIG. 4 is a representation of powder X-ray diffraction patterns of the following products: (A) example 9, calcined at 700° C., showing a typical monoclinic phase pattern; (B) example 1, calcined at 800° C., showing a mainly tetragonal phase pattern with a small amount of monoclinic phase; and (C) example 2, calcined at 800° C. showing a typical phase pattern for the metastable tetragonal phase.

In the case of zirconia based nanoparticles, after calcination, the material becomes highly crystalline nano-structured particles with a crystallite size of about 5–50 nm (FIG. 3). Powder XRD measurements reveal that the nano-structured particles are mainly in the tetragonal phase, although a small amount of monoclinic phase is also observable when, if a stabilizing agent is used as described below, the amount of stabilizing agent is low, or the treatment time is not long enough (FIG. 4). The nano-structured particles formed after calcination are porous aggregates of the nanometer sized crystallites. Both the crystallites and pores within a particle are fairly uniform in size. As noted above, the pores are generally in the mesopore range and the pore size distribution is at about 2 to 30 nanometers (FIG. 2).

According to another embodiment, the present invention provides nano-structured products whose surfaces have been stabilized by a stabilizer. The stabilizer imparts increased thermal stability to the nanoparticles. Preferably, the stabilizer is selected from the group of substances consisting of one or more oxo-anion species and corresponding oxides, wherein the oxo-anion species is selected from the group consisting of phosphate, silicate, aluminate, tungstate, molybdate, polytungstate, and polymolybdate, and the oxide is selected from the group consisting of silica, alumina, aluminum phosphate, tungsten oxide, and molybdenum oxide. The stabilizer may be used in conjunction with any of the above-described embodiments.

An effective stabilizing agent is preferably negatively charged under basic conditions and has strong bonding power toward the zirconia surface or other oxide surface with which it is to become associated. For example, silica may become soluble under highly basic and high temperature conditions forming negatively charged silicate species. Presumably, these species can effectively replace the $H_2O$ and OH— groups on the surface of the oxide and decrease the surface activity, thereby stabilizing the nanoparticles and preventing them from growing vigorously. The stabilizing species on the zirconia surface may also prohibit or delay the nucleation of the monoclinic phase during calcination and as a result, increase the phase transition temperature of the tetragonal phase to the monoclinic phase, thereby increasing the thermal stability of the nano-structured particle. When the nano-structured particles contains zirconia, preferably the stabilizer is selected such that the phase transition temperature is 600° C. or greater.

The effectiveness of some stabilizing agents on the thermal stability of zirconia nano-structured particles is summarized in FIG. 1. As can be seen, silicate, phosphate and aluminum phosphate are highly effective stabilizing agents. The BET surface area values of the samples stabilized by these species range from about 80 $m^2/g$ to as high as 140 $m^2/g$ after they are calcined at 800° C. for 6 hours. The transition metal oxoanions and polyoxoanions such tungstate, molybdate, polytungstate, polymolybdate, etc. have intermediate stabilizing effect, and the nano-structured particles stabilized by these species have somewhat less thermal stability compared to the products stabilized by their main group counterparts such as silicate and phosphate. Nonetheless, they may be desirable depending on the application into which the product is to be used. By contrast, those anions that decompose at elevated temperatures and evolve into gaseous species have limited stabilizing efficiencies. These species include sulfate, nitrate, chloride, etc.

Figure 5:
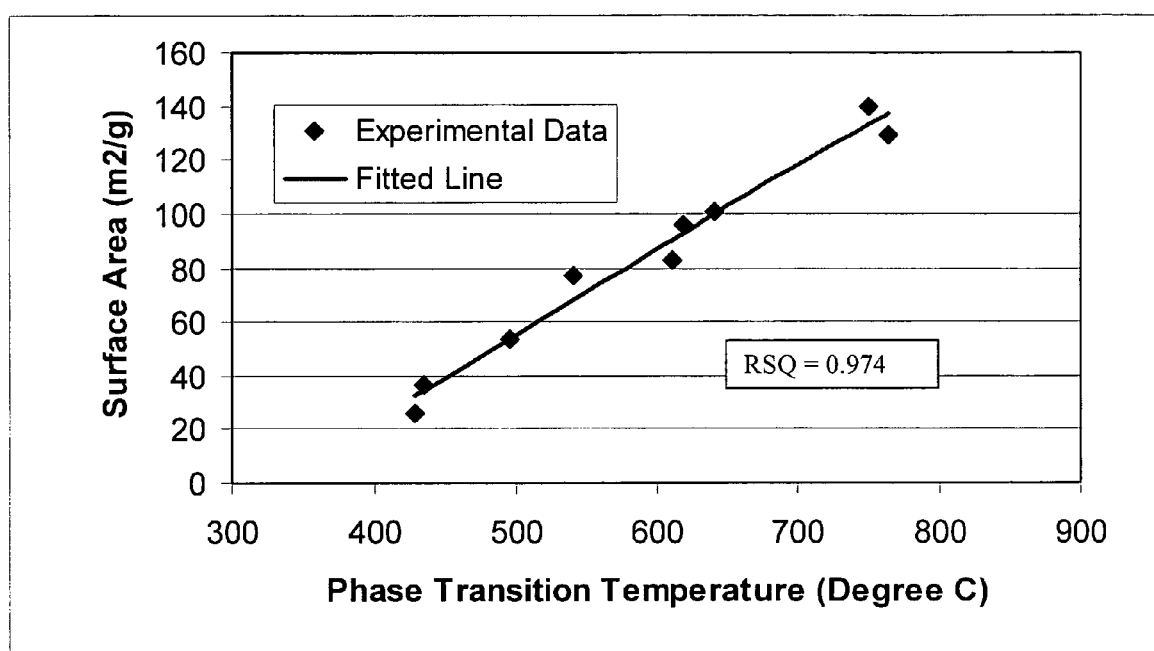
FIG. 5 is a represenation of a plot of BET surface area values against the tetragonal to monoclinic phase transition temperature derived from differential thermal analysis. The near straight line corelation indicates that the thermal stability of the nano-structured particles is determined by the stability of the metastable tetragonal phase.

The proposed mechanisms of zirconia nano-structured particles stabilization involve the modification of the nanoparticle surface by a stabilizing agent to increase the inertness toward interparticle condensation and decrease particle growth during calcination at high temperatures. This may be evidenced by the comparison of the crystallite size shown in the TEM images (FIG. 3). As seen in images in FIG. 3, the crystallite size in the comparative example (Images A and C) is around 50 nm while that of the examples with stabilizers is about 10 times smaller at around 5 nm. Another aspect of the stabilizing effect lies in the fact that a stabilizing agent can effectively delay the phase transition between the metastable tetragonal phase and the monoclinic phase. FIG. 5 shows the correlation of the BET surface area values of samples calcined under the same conditions (800° C. for 6 hours) but prepared using different stabilizing agents, versus the tetragonal to monoclinic phase transition temperatures derived from corresponding exotherm maxima in their differential thermal analysis (DTA) curves. The near-perfect straight line correlation clearly shows that the thermal stability and the surface area values of the nano-structured particles are closely related to the stability of the metastable tetragonal phase. The higher phase transition temperature correlates with the higher the thermal stability of the particles and the higher the surface area values. Therefore, this phase transition temperature may be used to quantitatively measure the thermal stability of the zirconia nano-structured particle products. Further, the phase transition temperature is also indicative of the effectiveness of a stabilizing agent.

The production of the thermally stable nano-structured particles according to this embodiment may be accomplished by the following steps: (a) combining a precursor solution and a base solution; (b) precipitating colloidal hydrous oxides by mixing a precursor solution with a base solution with an ending pH at 7 or above, preferably at 9 or above; (c) treating the precipitate in the presence of at least one surface stabilizing agent at 60° C. or higher, preferably 80° C. or higher with the pH of the aging precipitate constantly controlled at 7 or above with a base solution, preferably at 9 or above, for a period of about 10 hours or longer; (d) separating the treated particles by filtration or centrifugation and washing, and forming largely spherical particles by spray drying; and (e) calcining at a desired temperature, typically 600° C. to 1000° C., for 6 hours or longer.

Alternatively, the step (c) above may be carried out by using a sealed autoclave. In this case, the precipitated nanoparticle precursors are treated under virtually hydrothermal conditions. Due to higher pressure applied in addition to the elevated temperature, the treatment time may be substantially reduced. The preferred hydrothermal treatment time is 2 to 12 hours and the treatment temperature is 80° to 150° C. Higher treatment temperature and longer treatment time is not preferred because under hydrothermal conditions crystals grow much faster than at ambient pressure; high temperature and long treatment time may produce overgrown crystals with low surface area values. An advantage of the sealed reactor hydrothermal treatment is that addition of extra base is not needed, while it is necessary for the normal aging process described above.

The production step (c) above is particularly advantageous for the particles to gain high thermal stability. As noted above, high thermal stability indicates the desired crystalline phase and that high surface area values are maintained even after high temperature calcination. This may be evidenced by the fact that the specific surface area values of the particles change dramatically by the treatment conditions in step (c), such as addition of a stabilizing agent (see the data in Table 1 and the plots in FIG. 1), its concentration as in the case of 5 mol % $SiO_2$ vs. 10 mol % $SiO_2$ (Table 1 and FIG. 1), and other treatment conditions (for example, hydrothermal treatment produces more stable products than ambient pressure aging as shown by the data in Table 1 and FIG. 1).

Generally speaking, the production method of this embodiment may be used to produce high surface area products of zirconia, as well as other metal oxides such as $TiO_2$, $CeO_2$, etc., mixed metal oxides such as $ZrO_2/TiO_2$, $ZrO_2/CeO_2$, etc. and composite metal oxides. The high surface area and high thermal stability of the particulate products are useful as catalysts, catalyst supports, adsorbents, materials for separation membranes, etc., especially for applications in which high temperature operations are necessary. Those applications include DeNOx catalysis, auto-catalysis, and chemical catalysis for high temperature reactions.

The particularly advantageous high surface area and high thermal stability properties of the nano-structured particles produced according to this embodiment are believed to result from the nanoscale primary particles' being surface stabilized by the stabilizing agents and the unique, resulting stable mesoporous structure of the particle products. Each of the particles is formed by nanometer sized primary particles in such a manner that a large amount of the surfaces of the primary particles are still accesible while the particle structure is held together strongly and kept largely intact even under high temperature treatment.

As noted above, according to this embodiment, the precipitate that is obtained is treated at 60° C. or higher, preferably at 80° C. to refluxing temperature (around 102° C.), for a period from about 10 hours to several days. Higher treatment temperatures will speed up the treatment process. Further, under hydrothermal conditions, the treatment time can be shortened because both temperature and pressure help the treatment process. Additionally, in the cases in which the stabilizing agent needs to be dissolved first during the treatment, e.g. $SiO_2$, $AlPO_4$, etc., the time needed to completely dissolve it should be taken into account in determining the treatment time. Typically, dissolution is a slower process than bonding of the dissolved species on the oxide surface; therefore, the former determines the treatment time. In practice, the optimal treatment time may be determined by routine experimentaion that involves varying treantment time and monitoring surface area changes. The optimal treatment time is the time peroid at which the maximum surface area result is reached. Thus, further treatment does not increase the surface area any more.

For example, in an open reactor system at 80° C. and with 5 mol % fumed silica as a stabilizer, the nano-structured particles become fully stabilized after treatment for about 10 hours. During treatment, typically, the pH of the slurry decreases due to continuation of the hydrolysis reaction, which consumes hydroxide groups, the dissolution of the stabilizing agent (e.g. silica) and/or the evaporation of the base molecules such as $NH_3$. Extra base is added to the system whenever it is necessary to maintain the pH of the system at 7 or above, preferably 9 or above. Under hydrothermal conditions, the treatment time may be shortened to 2–3 hours and addition of extra base is not necessary.

After treatment, the products may be separated and washed via either filtration or centrifugation. The washed products are typically spray dried and then calcined at 700° C. or higher for at least 6 hours. The optimal calcination time may be determined by carrying out a number of calcination tests at different time periods. However, the inventors found that after 6 hours calcination, the specific surface area value is essentially stabilized.

Spray drying is prefered in order to control the particle geometry and overall particle size. Spray drying produces micrometer sized particles with largely spherical geometry. However, overall particle size and geometry control does not seem to alter the thermal stability and the surface area values of nano-structured particles. Both oven dried and spray dried particles show similar thermal stability and surface areas.

As noted above, the method of the produciton of the high thermal stability zirconia based particles may be used to produce other metal oxide products with high thermal stability. Examples include, but are not limited to, hafnia, titania, tin oxide, ceria, niobium oxide and tantalum oxide, mixed oxides of these metal species and composite oxides. The high thermal stability, nano-structured zirconia products have high application potentials as catalysts, catalyst support and carrier materials, adsorbents, porous membranes for separation or filtration, etc., especially for those application in which high temperature operations are necessary or are beneficial toward yield, efficiency, etc.

Supports or carrier materials may be further treated with active ingredients by depositing the active ingredients on their surfaces. Examples of active ingredients include but are not limited to sulfates, vanadates, molybdates, tungstates, silica, alumina, and other metal oxides, metal salts and metals. Methods for combining active ingredients with catalytic substances are well known to persons of ordinary skill in this art.

The compositions described above, and compositions produced according to the methods described above may be used to produce catalysts for removing commercially generated noxious substances. These noxious substances include, but are not limited to, the substances that are produced during operations of automobiles and power plants. Accordingly, the present invention may be used in automotive and power plants, as well as in other applications in which it is desirable to use catalysts.

Having described the invention with a degree of particularity, examples will now be provided. These examples are not intended to and should not be construed to limit the scope of the claims in any way. Although the invention may be readily understood through reference to the following examples, they are provided by way of illustration and are not intended to limit the present invention unless specified.

EXAMPLES

Example 1

1000 ml of 0.8 mol/l zirconium oxychloride solution prepared by dissolving $ZrOCl_2.6H_2O$ crystalline powder in deionized water was delivered into a 3 liter double wall glass reactor containing 1000 g 20 wt. % ammonia solution. The reactor was equiped with a programmable heat circulating bath, a pH controller with a pH electrode, an overhead stirrer and liquid pumps as needed. The delivery was completed in 60 minutes (about 16.7 ml/min) under strong agitation and constant temperature at 30° C. The pH decreased from the pH 11.2 of the ammonia solution before zirconium solution delivery to about pH 9.6 after the zirconium precipitation. After precipitation, fumed $SiO_2$ (5 mol % of zirconia) was added and the temperature was raised to 85° C. Under constant agitation, the precipitate was aged at about 85° C. for 48 hours with pH controlled at or above 9.0 by automatically pumping in the ammonia solution while the liquid pump was controlled by the pH controller. The aged precipitate was then filtered and washed with deionized water several times until the conductivity of the filtrate was lower than 1 mS/cm. The washed material was slurried and spray dried. Portions of the sample were calcined at 700° C., 800° C. and 900° C., respectively, for 6 hours. BET surface area values are summarized in Table 1.

Example 2

The precipitation of zirconium oxychloride was the same as for Example 1. However, 10 mol % of fumed $SiO_2$ was added before the precipitate was aged. Portions of the samples were also calcined at 700° C., 800° C. and 900° C., respectively, for 6 hours. The BET surface area results are given in Table 1.

Example 3

The zirconium oxychloride precipitation method and the silica percentage used were the same as for Example 2. However, the pH of the precipitate was adjusted to 11 before aging, and the aging was done in a sealed, agitated autoclave at 90° C. for 12 hours. No base was added during the hydrothermal aging process. The product was processed the same way and calcined at 700° C., 800° C. and 900° C., in small portions as above. The BET results are given in Table 1.

Example 4

The precipitation of zirconium oxychloride and the silica percentage used were the same as for Example 1. However, tetraethylorthosilicate (TEOS) was used as a silicate precursor. TEOS hydrolyzes in water under basic conditions forming simple or oligomeric silicate species. The aging and finishing processes used were the same as for Example 1. Portions of the sample were also calcined at 700° C., 800° C. and 900° C., respectively for 6 hours. The BET surface area results were given in Table 1.

Example 5

The zirconium oxychloride precipitation was the same as for Example 1. However, 5 mol % of aluminium phosphate ($AlPO_4$) was added before the elevated temperature aging. The aging and finishing processes were done in the same way as for Example 1. Portions of the sample were calcined at 600° C., 700° C., 800° C. and 900° C., for 6 hours. The BET surface area data were given in Table 1.

Example 6

The zirconium oxychloride precipitation and the stabilizing agent (5 mol % $AlPO_4$) were the same as in Example 5. However, the aging was carried out under hydrothermal conditions as for Example 3, i.e., at 90° C. for 12 hours and no extra base added during hydrothermal treatment. Portions of the sample were also calcined at 600° C., 700° C., 800° C. and 900° C., respectively. The BET surface area data were given in Table 1.

Example 7

The precipitation of zirconium oxychloride was done in the same way as for Example 1. However, 10 mol % ammonium hydrogen phosphate (($NH_4)_2HPO_4$) was used as the stabilizing agent and added before aging. The aging and finishing processes were carried out in the same way as for Example 1. Again, portions of the sample were calcined at 600° C., 700° C., 800° C., and 900° C., respectively. The BET surface area data were given in Table 1.

Example 8

The precipitation of zirconium oxychloride was done in the same way as for Example 1. However, 5 mol % (in W) of ammonium paratungstate ($(NH_4)_{10}W_{12}O_{41}\cdot 5H_2O$) was used as the stabilizing agent and added before aging. The aging and finishing processes were the same as for Example 1. Portions of the sample were calcined at 500° C., 600° C., 700° C. and 800° C. respectively for 6 hours. The BET surface area data were given in Table 1.

Example 9

The precipitation of zirconium oxychloride was carried out in the same way as for Example 1. The precipitate was aged at elevated temperature under the same conditions as for Eaxample 1. However, no stabilizing agent was added before aging treatment. Since the chloride salt was used as a zirconia precursor and ammonia was used as base in the precipitation, ammonium chloride may be considered as a stabilizing agent. After aging treatnment, the sample was finished by washing and drying. Portions of the sample were calcined at 500° C., 600° C., 700° C., 800° C. and 900° C., respectively for 6 hours. The BET surface area data were given in Table 1.

Comparative Example 1

The precipitation of zirconium oxychloride was carried out in the same way as for Example 1. However, the precipitate was not aged, and no stabilizing agent was added. The product was finished by washing and drying. Portions of the sample were calcined at 600° C., 700° C., 800° C. and 900° C., respectively for 6 hours. The BET surface area data were given in Table 1.

TABLE 1

BET surface area values in $m^2/g$.
All samples calcined at a temperature given for 6 hours

| | Stabilizer | 500° C. | 600° C. | 700° C. | 800° C. | 900° C. |
|---|---|---|---|---|---|---|
| Comparative Example 1 | No stabilizer/Not aged | — | 49.8 | 20.3 | 14.2 | 8.4 |
| Example 9 | No stabilizer/Aged | 76.5 | 60.5 | 44.9 | 36.4 | 24.9 |
| Example 1 | 5 mol % fumed $SiO_2$/Aged | — | — | 96.6 | 77.5 | 44.7 |
| Example 2 | 10 mol % fumed $SiO_2$/Aged | — | — | 126.8 | 96.1 | 61.9 |
| Example 3 | 10 mol % fumed $SiO_2$, Hydrothermally Aged | — | — | 156.2 | 139.5 | 108.4 |
| Example 4 | 5 mol % TEOS*/Aged | — | — | 96.3 | 71.1 | 45.9 |
| Example 5 | 5 mol % $AlPO_4$/Aged | — | 136.2 | 103.2 | 82.9 | 59.0 |
| Example 6 | 5 mol % $AlPO_4$, Hydrothermally Aged | — | 199.8 | 144.0 | 128.8 | 104.0 |
| Example 7 | 10 mol % $(NH_4)_2HPO_4$/Aged | — | 147.2 | 121.8 | 100.8 | 57.0 |
| Example 8 | 20 mol % (as $WO_3$) APT** | 117.6 | 90.7 | 73.8 | 58.2 | — |

*TEOS stands for tetraethoxysilane;
**APT stands for ammonium paratungstate.
The absence of a value at a particular temperature indicates that the particular sample was not calcined at that temperature.

A review of the data in Table 1 demonstrates that aging alone increases the BET surface area and that adding a stabilizer in combination increases the BET surface area further. Additionally, an increase in the concentration of the stabilizer further increases the BET surface area.

What is claimed:

1. A composition comprised of nano-structured metal oxide particles and at least one stabilizing agent, wherein said nano-structured metal oxide particles have a surface area of greater than or equal to 50 $m^2/g$, are comprised of primary particles in the size range of 5 nm to 50 nm and are mesoporous, having a pore size distribution between 2 nm and 30 nm, wherein said nano-structured metal oxide particles are thermally stable at a temperature of at least 600° C. for at least 6 hours, and wherein said stabilizing agent is selected from the group consisting of silicate, phosphate, and aluminum phosphate.

2. The composition of claim 1, wherein said nano-structured metal oxide particles comprise zirconia.

3. The composition of claim 2, wherein said primary particles are of a size between 5 and 20 nm, have a surface area of greater than or equal to 70 $m^2/g$ and have a pore size distribution of about 2 nm to about 20 nm.

4. The composition of claim 3, wherein said nano-structured metal oxide particles have a tetragonal-to-monoclinic phase transition temperature of about 600° C. or greater.

5. The composition of claim 4, wherein at least 90% of said nano-structured metal oxide particles are in tetragonal crystalline form.

6. A catalyst comprised of the composition of claim 1 and at least one active ingredient selected from the group consisting of sulfates, vanadates, molybdates, tungstates, silica, alumina, metal oxides, metal salts and metals.

7. A catalyst comprised of the composition of claim 2 and at least one active ingredient selected from the group consisting of sulfates, vanadates, molybdates, tungstates, alumina, silica, metal oxides, metal salts and metals.

8. A method of producing a composition comprised of nanoparticle and at least one stabilizing agent, said method comprising aging nanoparticle precursors in a liquid suspension at a temperature of greater than or equal to 60° C. while maintaining a pH of greater than or equal to pH 7 and adding at least one stabilizing agent selected from the group consisting of silicate, phosphate, and aluminum phosphate.

9. The method according to claim 8, wherein said nanoparticle precursors comprise at least one oxide selected from the group consisting of zirconia, hafnia, titania, tin oxide, ceria, niobium oxide or tantalum oxide.

10. A method of producing thermally stable nano-structured particles comprising: (a) preparing a precursor solution comprised of nanoparticle precursors and a base solution; (b) precipitating a colloidal hydrous oxide by combining said precursor solution with said base solution at a final pH of pH 7 or greater; (c) treating said colloidal hydrous oxide with at least one stabilizing agent selected from the group consisting of silicate, phosphate, and aluminum phosphate to form treated particles; and (d) drying said treated particles to form dried particles.

11. The method according to claim 10, further comprising calcining said dried particles to form calcined particles.

12. The method according to claim 11, wherein said calcining is conducted at a temperature of at least 600° C.

13. The method according to claim 12, wherein said calcined particles are thermally stable at a temperature of at least 600° C. for at least 6 hours.

14. The method according to claim 10, wherein said nanoparticle precursors comprise a zirconium salt solution or an organic zirconium compound.

15. The method according to claim 10, wherein the said colloidal hydrous oxide is treated at a temperature of at least 80° C. and a pH of at least pH 9.

16. The method according to claim 10, wherein said colloidal hydrous oxide is treated in a sealed autoclave at a temperature in the range of 80° C. to 150° C.

* * * * *